US011695685B2

(12) United States Patent
Bidgoli

(10) Patent No.: US 11,695,685 B2
(45) Date of Patent: Jul. 4, 2023

(54) SUPPORTING CANDIDATE PATH SELECTION

(71) Applicant: Nokia Solutions and Networks Oy, Espoo (FI)

(72) Inventor: Hooman Bidgoli, Ottowa (CA)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/902,970

(22) Filed: Jun. 16, 2020

(65) Prior Publication Data

US 2021/0392072 A1    Dec. 16, 2021

(51) Int. Cl.
*H04L 45/16* (2022.01)
*H04L 45/00* (2022.01)
(Continued)

(52) U.S. Cl.
CPC ............ *H04L 45/16* (2013.01); *H04L 45/22* (2013.01); *H04L 45/24* (2013.01); *H04L 45/28* (2013.01); *H04L 45/48* (2013.01)

(58) Field of Classification Search
CPC ......... H04L 12/18; H04L 45/16; H04L 45/22; H04L 45/24; H04L 45/28; H04L 45/48
See application file for complete search history.

(56) References Cited

U.S. PATENT DOCUMENTS

| 6,744,775 B1 * | 6/2004 | Beshai | H04L 45/02 |
| | | | 370/395.31 |
| 8,837,479 B1 * | 9/2014 | Kumar | H04L 45/28 |
| | | | 370/248 |

(Continued)

FOREIGN PATENT DOCUMENTS

WO    WO-2011038750 A1 *    4/2011    ............. H04L 45/28

OTHER PUBLICATIONS

Y. Bejerano et al., "Resilient multipoint networks based on redundant trees," in Bell Labs Technical Journal, vol. 14, No. 2, pp. 113-130, Summer 2009, doi: 10.1002/bltj.20376. (Year: 2009).*

(Continued)

*Primary Examiner* — Patrice L Winder
(74) *Attorney, Agent, or Firm* — Tong, Rea, Bentley & Kim, LLC

(57) ABSTRACT

Various example embodiments for supporting candidate path selection in a communication system are presented. The support for candidate path selection may be based on candidate path preference information of the candidate paths where the candidate path preference information of the candidate paths may be configured for use by network devices in selecting between the candidate paths. The support for candidate path selection based on candidate path preference information of the candidate paths may be provided within the context of candidate path selection which may include failover switching. The support for candidate path selection based on candidate path preference information may be based on support for distribution of the candidate path preference information of the candidate paths to network devices and use of the candidate path preference information of the candidate paths by the network devices to support selection of the candidate paths.

17 Claims, 7 Drawing Sheets

(51) Int. Cl.
  *H04L 45/24* (2022.01)
  *H04L 45/28* (2022.01)
  *H04L 45/48* (2022.01)

(56) References Cited

U.S. PATENT DOCUMENTS

| | | | | |
|---|---|---|---|---|
| 8,848,705 B2* | 9/2014 | Chen | .................. | H04L 45/16 370/389 |
| 8,908,501 B2* | 12/2014 | Chen | .................. | H04L 45/02 370/217 |
| 9,160,651 B2* | 10/2015 | Allan | .................. | H04L 45/22 |
| 9,210,038 B1* | 12/2015 | Rauser | .................. | H04L 43/0894 |
| 9,219,614 B2* | 12/2015 | Zhao | .................. | H04L 41/0654 |
| 9,231,851 B2* | 1/2016 | Chen | .................. | H04L 45/04 |
| 9,252,964 B2* | 2/2016 | Singh | .................. | H04L 45/16 |
| 9,380,512 B2* | 6/2016 | Merlin | .................. | H04L 45/16 |
| 9,455,917 B2* | 9/2016 | Patil | .................. | H04L 47/122 |
| 9,602,387 B2* | 3/2017 | Wood | .................. | H04L 45/16 |
| 9,686,167 B2* | 6/2017 | Dunbar | .................. | H04L 45/28 |
| 9,806,895 B1* | 10/2017 | Kommula | .................. | H04L 45/16 |
| 9,843,502 B2* | 12/2017 | Ubaldi | .................. | H04L 45/02 |
| 10,057,121 B2* | 8/2018 | Jha | .................. | H04L 49/201 |
| 10,069,639 B2* | 9/2018 | Bragg | .................. | H04L 45/12 |
| 10,355,981 B1* | 7/2019 | Matthews | .................. | H04L 45/22 |
| 10,382,315 B2* | 8/2019 | Barry | .................. | H04L 45/66 |
| 10,432,425 B2* | 10/2019 | Wang | .................. | H04L 12/4633 |
| 10,749,711 B2* | 8/2020 | Mukundan | .................. | H04L 45/24 |
| 11,329,912 B2* | 5/2022 | Kaplan | .................. | H04L 45/28 |
| 2007/0201355 A1* | 8/2007 | Vasseur | .................. | H04L 45/16 370/252 |
| 2010/0080120 A1* | 4/2010 | Bejerano | .................. | H04L 45/16 370/228 |
| 2011/0051726 A1* | 3/2011 | Bejerano | .................. | H04L 45/16 370/390 |
| 2011/0063973 A1* | 3/2011 | VenkataRaman | .................. | H04L 45/50 370/242 |
| 2012/0099422 A1* | 4/2012 | Liu | .................. | H04L 45/22 370/221 |
| 2012/0195229 A1* | 8/2012 | Chen | .................. | H04L 45/12 370/254 |
| 2012/0213224 A1* | 8/2012 | Chen | .................. | H04L 45/16 370/390 |
| 2013/0250808 A1* | 9/2013 | Hui | .................. | H04W 40/023 370/255 |
| 2016/0057061 A1* | 2/2016 | Avci | .................. | H04L 41/145 370/235 |
| 2017/0085424 A1* | 3/2017 | Jha | .................. | H04L 45/16 |
| 2017/0214720 A1* | 7/2017 | Inamdar | .................. | H04L 47/10 |
| 2018/0302321 A1* | 10/2018 | Manthiramoorthy | ... | H04L 45/48 |
| 2019/0036717 A1* | 1/2019 | Kebler | .................. | H04L 12/18 |
| 2020/0259680 A1* | 8/2020 | Thubert | .................. | H04L 12/44 |
| 2021/0160167 A1* | 5/2021 | Zhou | .................. | H04L 45/20 |

OTHER PUBLICATIONS

D. Kotani, K. Suzuki and H. Shimonishi, "A Design and Implementation of OpenFlow Controller Handling IP Multicast with Fast Tree Switching," 2012 IEEE/IPSJ 12th International Symposium on Applications and the Internet, 2012, pp. 60-67, doi: 10.1109/SAINT.2012.17. (Year: 2012).*

Voyer, D., et al., "Segment Routing Point-to-Multipoint Policy," draft-voyer-pim-sr-p2mp-policy-00, Network Working Group, Internet-Draft, Oct. 11, 2019, 12 pages.

Bidgoli, H., et al., "YANG Data Model for p2mp sr policy," draft-hb-spring-sr-p2mp-policy-yang-00, Network Working Group, Internet-Draft, Jul. 6, 2019, 13 pages.

Voyer, D., et al., "SR Replication Policy for P2MP Service Delivery," draft-voyer-spring-sr-p2mp-policy-03, Network Working Group, Internet-Draft, Jul. 2, 2019, 11 pages.

Bidgoli, H. et al., "PCEP extensions for p2mp sr policy," draft-hsd-pce-sr-p2mp-policy-01, Network Working Group, Internet Draft Nov. 2, 2019, 35 pages.

Voyer, D., et al., "Segment Routing Point-to-Multipoint Policy," draft-voyer-pim-sr-p2mp-policy-01, Network Working Group, Internet-Draft, Apr. 13, 2020, 12 pages.

Filsfils, C., et al., "Segment Routing Policy Architecture," draft-ietf-spring-segment-routing-policy-07, SPRING Working Group, May 7, 2020, 36 pages.

EP Search Report mailed in corresponding EP 21178946.6 dated Oct. 5, 2021, 8 pages.

EP Search Report mailed in corresponding EP 21178946.6 dated Oct. 6, 2022, 4 pages.

* cited by examiner

SUPPORTING CANDIDATE PATH SELECTION

TECHNICAL FIELD

Various example embodiments relate generally to communication systems and, more particularly but not exclusively, to supporting candidate path selection in various types of communication systems.

BACKGROUND

Communication systems may use sets of candidate paths to support communication of various types of information over various types of underlying communication networks.

SUMMARY

In at least some example embodiments, an apparatus includes at least one processor and at least one memory including a set of instructions, wherein the set of instructions is configured to, when executed by the at least one processor, cause the apparatus to receive, by a network device for each candidate path in a set of candidate paths supporting multicast traffic, a respective preference value indicative of a preference for the respective candidate path and select, by the network device based on at least one of the preference values, one of the candidate paths from which to accept the multicast traffic. In at least some example embodiments, for at least one of the candidate paths, the respective preference value is received in a failure detection message configured to support failure detection for the respective candidate path. In at least some example embodiments, the failure detection message includes a point-to-multipoint bidirectional failure detection message. In at least some example embodiments, the failure detection message includes a Bidirectional Forwarding Detection (BFD) packet. In at least some example embodiments, the failure detection message includes a Point-to-Multipoint (P2MP) Bidirectional Forwarding Detection (BFD) packet. In at least some example embodiments, the respective preference value is received in a Type-Length-Value (TLV) of the P2MP BFD packet. In at least some example embodiments, the set of instructions is configured to, when executed by the at least one processor, cause the apparatus to detect, by the network device based on one or more failure detection messages, a failure of the one of the candidate paths and select, by the network device, a new one of the candidate paths from which to accept the multicast traffic. In at least some example embodiments, the failure of the one of the candidate paths is detected based on monitoring of respective traffic rates for the respective candidate paths. In at least some example embodiments, for at least one of the candidate paths, the respective preference value is received as a part of configuration information for a multicast forwarding element of the network device. In at least some example embodiments, the multipath forwarding element includes a replication segment. In at least some example embodiments, the configuration information is received from a network controller. In at least some example embodiments, the configuration information is received via a command line interface (CLI). In at least some example embodiments, the set of instructions is configured to, when executed by the at least one processor, cause the apparatus to detect, by the network device based on one or more failure detection messages, a failure of the one of the candidate paths and select, by the network device, a new one of the candidate paths from which to accept the multicast traffic. In at least some example embodiments, the failure of the one of the candidate paths is detected based on at least one of monitoring for respective failure detection messages for the respective candidate paths or monitoring of respective traffic rates for the respective candidate paths. In at least some example embodiments, the one of the candidate paths from which to accept the multicast traffic is one of the candidate paths having a highest preference value. In at least some example embodiments, the set of candidate paths is associated with a multicast tree having a root node and a set of leaf nodes. In at least some example embodiments, the set of candidate paths is associated with a point-to-multipoint (P2MP) policy. In at least some example embodiments, the network device includes one of the leaf routers.

In at least some example embodiments, a non-transitory computer readable medium stores a set of instructions which, when executed by at least one processor, causes an apparatus to receive, by a network device for each candidate path in a set of candidate paths supporting multicast traffic, a respective preference value indicative of a preference for the respective candidate path and select, by the network device based on at least one of the preference values, one of the candidate paths from which to accept the multicast traffic. In at least some example embodiments, for at least one of the candidate paths, the respective preference value is received in a failure detection message configured to support failure detection for the respective candidate path. In at least some example embodiments, the failure detection message includes a point-to-multipoint bidirectional failure detection message. In at least some example embodiments, the failure detection message includes a Bidirectional Forwarding Detection (BFD) packet. In at least some example embodiments, the failure detection message includes a Point-to-Multipoint (P2MP) Bidirectional Forwarding Detection (BFD) packet. In at least some example embodiments, the respective preference value is received in a Type-Length-Value (TLV) of the P2MP BFD packet. In at least some example embodiments, the set of instructions is configured to, when executed by the at least one processor, cause the apparatus to detect, by the network device based on one or more failure detection messages, a failure of the one of the candidate paths and select, by the network device, a new one of the candidate paths from which to accept the multicast traffic. In at least some example embodiments, the failure of the one of the candidate paths is detected based on monitoring of respective traffic rates for the respective candidate paths. In at least some example embodiments, for at least one of the candidate paths, the respective preference value is received as a part of configuration information for a multicast forwarding element of the network device. In at least some example embodiments, the multipath forwarding element includes a replication segment. In at least some example embodiments, the configuration information is received from a network controller. In at least some example embodiments, the configuration information is received via a command line interface (CLI). In at least some example embodiments, the set of instructions is configured to, when executed by the at least one processor, cause the apparatus to detect, by the network device based on one or more failure detection messages, a failure of the one of the candidate paths and select, by the network device, a new one of the candidate paths from which to accept the multicast traffic. In at least some example embodiments, the failure of the one of the candidate paths is detected based on at least one of monitoring for respective failure detection messages for the respective candidate paths or monitoring of respective traffic rates for the respective candidate paths. In at least some example embodiments, the one of the candidate paths from which to accept the multicast traffic is one of the candidate paths having a highest preference value. In at least some example embodiments, the set of candidate paths is associated with a multicast tree having a root node and a set of leaf nodes. In at least some example embodiments, the set of candidate paths is associated with a point-to-multipoint (P2MP) policy. In at least some example embodiments, the network device includes one of the leaf routers.

In at least some example embodiments, a method includes receiving, by a network device for each candidate path in a set of candidate paths supporting multicast traffic, a respective preference value indicative of a preference for the respective candidate path and selecting, by the network device based on at least one of the preference values, one of the candidate paths from which to accept the multicast traffic. In at least some example embodiments, for at least one of the candidate paths, the respective preference value is received in a failure detection message configured to support failure detection for the respective candidate path. In at least some example embodiments, the failure detection message includes a point-to-multipoint bidirectional failure detection message. In at least some example embodiments, the failure detection message includes a Bidirectional Forwarding Detection (BFD) packet. In at least some example embodiments, the failure detection message includes a Point-to-Multipoint (P2MP) Bidirectional Forwarding Detection (BFD) packet. In at least some example embodiments, the respective preference value is received in a Type-Length-Value (TLV) of the P2MP BFD packet. In at least some example embodiments, the method includes detecting, by the network device based on one or more failure detection messages, a failure of the one of the candidate paths and selecting, by the network device, a new one of the candidate paths from which to accept the multicast traffic. In at least some example embodiments, the failure of the one of the candidate paths is detected based on monitoring of respective traffic rates for the respective candidate paths. In at least some example embodiments, for at least one of the candidate paths, the respective preference value is received as a part of configuration information for a multicast forwarding element of the network device. In at least some example embodiments, the multipath forwarding element includes a replication segment. In at least some example embodiments, the configuration information is received from a network controller. In at least some example embodiments, the configuration information is received via a command line interface (CLI). In at least some example embodiments, the method includes detecting, by the network device based on one or more failure detection messages, a failure of the one of the candidate paths and selecting, by the network device, a new one of the candidate paths from which to accept the multicast traffic. In at least some example embodiments, the failure of the one of the candidate paths is detected based on at least one of monitoring for respective failure detection messages for the respective candidate paths or monitoring of respective traffic rates for the respective candidate paths. In at least some example embodiments, the one of the candidate paths from which to accept the multicast traffic is one of the candidate paths having a highest preference value. In at least some example embodiments, the set of candidate paths is associated with a multicast tree having a root node and a set of leaf nodes. In at least some example embodiments, the set of candidate paths is associated with a point-to-multipoint (P2MP) policy. In at least some example embodiments, the network device includes one of the leaf routers.

In at least some example embodiments, an apparatus includes means for receiving, by a network device for each candidate path in a set of candidate paths supporting multicast traffic, a respective preference value indicative of a preference for the respective candidate path and means for selecting, by the network device based on at least one of the preference values, one of the candidate paths from which to accept the multicast traffic. In at least some example embodiments, for at least one of the candidate paths, the respective preference value is received in a failure detection message configured to support failure detection for the respective candidate path. In at least some example embodiments, the failure detection message includes a point-to-multipoint bidirectional failure detection message. In at least some example embodiments, the failure detection message includes a Bidirectional Forwarding Detection (BFD) packet. In at least some example embodiments, the failure detection message includes a Point-to-Multipoint (P2MP) Bidirectional Forwarding Detection (BFD) packet. In at least some example embodiments, the respective preference value is received in a Type-Length-Value (TLV) of the P2MP BFD packet. In at least some example embodiments, the apparatus includes means for detecting, by the network device based on one or more failure detection messages, a failure of the one of the candidate paths and selecting, by the network device, a new one of the candidate paths from which to accept the multicast traffic. In at least some example embodiments, the failure of the one of the candidate paths is detected based on monitoring of respective traffic rates for the respective candidate paths. In at least some example embodiments, for at least one of the candidate paths, the respective preference value is received as a part of configuration information for a multicast forwarding element of the network device. In at least some example embodiments, the multipath forwarding element includes a replication segment. In at least some example embodiments, the configuration information is received from a network controller. In at least some example embodiments, the configuration information is received via a command line interface (CLI). In at least some example embodiments, the apparatus includes means for detecting, by the network device based on one or more failure detection messages, a failure of the one of the candidate paths and selecting, by the network device, a new one of the candidate paths from which to accept the multicast traffic. In at least some example embodiments, the failure of the one of the candidate paths is detected based on at least one of monitoring for respective failure detection messages for the respective candidate paths or monitoring of respective traffic rates for the respective candidate paths. In at least some example embodiments, the one of the candidate paths from which to accept the multicast traffic is one of the candidate paths having a highest preference value. In at least some example embodiments, the set of candidate paths is associated with a multicast tree having a root node and a set of leaf nodes. In at least some example embodiments, the set of candidate paths is associated with a point-to-multipoint (P2MP) policy. In at least some example embodiments, the network device includes one of the leaf routers.

In at least some example embodiments, an apparatus includes at least one processor and at least one memory including a set of instructions, wherein the set of instructions is configured to, when executed by the at least one processor, cause the apparatus to send, by a device toward a network device configured to receive multicast traffic via a set of candidate paths, a respective set of preference values for the respective candidate paths. In at least some example embodiments, for at least one of the candidate paths, the respective preference value is sent in a failure detection message configured to support failure detection for the respective candidate path. In at least some example embodiments, for at least one of the candidate paths, the respective preference value is sent as a part of configuration information for a multicast forwarding element of the network device. In at least some example embodiments, the multipath forwarding element includes a replication segment. In at least some example embodiments, the set of candidate paths is associated with a multicast tree having a root node and a set of leaf nodes. In at least some example embodiments, the set of candidate paths is associated with a point-to-multipoint (P2MP) policy.

In at least some example embodiments, a non-transitory computer readable medium stores a set of instructions which, when executed by at least one processor, causes an apparatus to send, by a device toward a network device configured to receive multicast traffic via a set of candidate paths, a respective set of preference values for the respective candidate paths. In at least some example embodiments, for at least one of the candidate paths, the respective preference value is sent in a failure detection message configured to support failure detection for the respective candidate path. In at least some example embodiments, for at least one of the candidate paths, the respective preference value is sent as a part of configuration information for a multicast forwarding element of the network device. In at least some example embodiments, the multipath forwarding element includes a replication segment. In at least some example embodiments, the set of candidate paths is associated with a multicast tree having a root node and a set of leaf nodes. In at least some example embodiments, the set of candidate paths is associated with a point-to-multipoint (P2MP) policy.

In at least some example embodiments, a method includes sending, by a device toward a network device configured to receive multicast traffic via a set of candidate paths, a respective set of preference values for the respective candidate paths. In at least some example embodiments, for at least one of the candidate paths, the respective preference value is sent in a failure detection message configured to support failure detection for the respective candidate path. In at least some example embodiments, for at least one of the candidate paths, the respective preference value is sent as a part of configuration information for a multicast forwarding element of the network device. In at least some example embodiments, the multipath forwarding element includes a replication segment. In at least some example embodiments, the set of candidate paths is associated with a multicast tree having a root node and a set of leaf nodes. In at least some example embodiments, the set of candidate paths is associated with a point-to-multipoint (P2MP) policy.

In at least some example embodiments, an apparatus includes means for sending, by a device toward a network device configured to receive multicast traffic via a set of candidate paths, a respective set of preference values for the respective candidate paths. In at least some example embodiments, for at least one of the candidate paths, the respective preference value is sent in a failure detection message configured to support failure detection for the respective candidate path. In at least some example embodiments, for at least one of the candidate paths, the respective preference value is sent as a part of configuration information for a multicast forwarding element of the network device. In at least some example embodiments, the multipath forwarding element includes a replication segment. In at least some example embodiments, the set of candidate paths is associated with a multicast tree having a root node and a set of leaf nodes. In at least some example embodiments, the set of candidate paths is associated with a point-to-multipoint (P2MP) policy.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting candidate path selection in a communication system are presented. The support for candidate path selection may be based on candidate path preference information of the candidate paths where the candidate path preference information of the candidate paths may be configured for use by network devices in selecting between the candidate paths. The support for candidate path selection based on candidate path preference information of the candidate paths may be provided within the context of candidate path selection which may include failover switching. The support for candidate path selection based on candidate path preference information of the candidate paths may be provided in a manner for supporting fast failover switching. The support for candidate path selection based on candidate path preference information may be based on support for distribution of the candidate path preference information of the candidate paths to network devices and use of the candidate path preference information of the candidate paths by the network devices to support selection of the candidate paths. The support for distribution of the candidate path preference information of the candidate paths to network devices may include distribution of the candidate path preference information of the candidate paths based on a failure detection protocol, distribution of the candidate path preference information of the candidate paths based on network configuration operations (e.g., configuration by a controller such as a path computation element (PCE) or the like, configuration by a user based on an interface such as a command line interface (CLI) or the like, and so forth), or the like, as well as various combinations thereof. The support for use of the candidate path preference information of the candidate paths by the network devices to support switching between the candidate paths may include selecting one of the candidate paths from which to receive traffic based on the candidate path preference information of the candidate paths (e.g., an initial selection from the set of candidate paths, a selection in response to a failure of one or more of the candidate paths, or the like, as well as various combinations thereof). The support for candidate path selection based on candidate path preference information may include support for failure detection for supporting switching between candidate paths within the context of failover switching. The support for candidate path selection may be provided within the context of various types of communication networks, for various types of candidate paths, and the like, as well as various combinations thereof. It will be appreciated that these and various other example embodiments and advantages or potential advantages of supporting candidate path selection in communication systems may be further understood by way of reference to the various figures, which are discussed further below.

Figure 1:
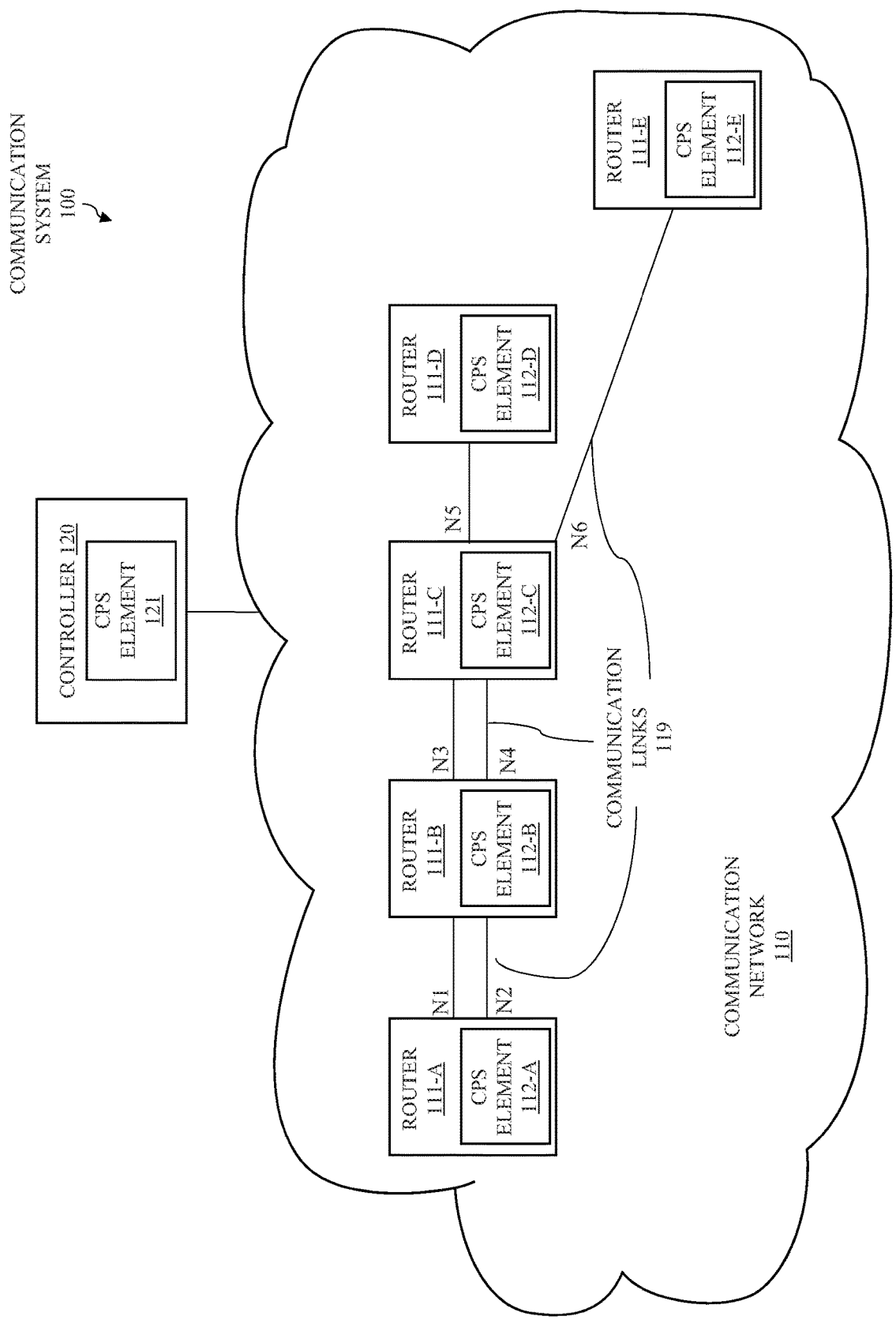
FIG. 1 depicts an example embodiment of a communication system configured to support candidate path selection in a communication network.

FIG. 1 depicts an example embodiment of a communication system configured to support candidate path selection in a communication network.

The communication system 100 includes a communication network 110 and a network controller 120 configured to provide control functions for the communication network 110. It will be appreciated that, although primarily presented with respect to a specific arrangement of the communication system 100, the communication system 100 may be arranged in various other ways.

The communication network 110 includes a set of nodes 111 connected via a set of communication links 119. The set of nodes 111 includes nodes 111-A-111-E (collectively, nodes 111) which are arranged in a tree-like structure in which node 111-A is connected to node 111-B via a pair of communication links 119 (labeled as N1 and N2, respectively), node 111-B is connected to node 111-C via a pair of communication links 119 (labeled as N3 and N4, respectively), and node 111-C is connected to nodes 111-D and 111-E via a pair of communication links 119 (labeled as N5 for node 111-D and N6 for node 111-E). The nodes 111 may be routers, switches, or the like. The nodes 111-A-111-E include candidate path selection elements 112-A-112-E, respectively, configured to enable the nodes 111 to support various embodiments of candidate path selection as presented herein (e.g., communication of candidate path preference information, use of candidate path preference information for selecting candidate paths and switching between candidate paths, or the like, as well as various combinations thereof). It will be appreciated that fewer or more nodes 111 may be used, nodes 111 may be arranged in other ways, or the like, as well as various combinations thereof.

The network controller 120 is configured to provide control functions for communication network 110. For example, the network controller 120 may be configured to support control functions such as configuration of the nodes 111, monitoring of the nodes 111, monitoring of the communication links 119, or the like, as well as various combinations thereof. The network controller 120 includes a candidate path selection element 121 configured to enable the network controller 120 to support various embodiments of candidate path selection as presented herein (e.g., communication of candidate path preference information or the like, as well as various combinations thereof). It will be appreciated that the network controller 120 may support various other control functions for communication network 110.

The communication system 100 is configured to support a Point-to-Multipoint (P2MP) Policy. In general, P2MP Policy provides a way to program P2MP trees via a controller. The P2MP Policy infrastructure is described in the draft-voyer-pim-sr-p2mp-policy document and the P2MP Policy objects are described in the draft-hb-spring-sr-p2mp-policy-yang document (although it will be appreciated that other implementations of P2MP Policy may be used). A P2MP Policy is composed of a root (e.g., node 111-A), a set of leaves (e.g., nodes 111-D and 111-E), and a set of candidate paths connecting the root to the set of leaves based on certain traffic engineering (TE) parameters. The root node sends the multicast traffic on each of the candidate paths such that the multicast traffic is received by the leaf nodes via each of the candidate paths. The candidate paths of the P2MP Policy operate as a set of redundant P2MP trees configured to deliver multicast traffic from the root to the leaves. The candidate paths may be programmed via multiple mechanisms, such as dynamically via a controller (e.g., by the network controller 120), statically via a command line interface (CLI), or a combination thereof. The candidate paths of the P2MP Policy have candidate path preferences associated therewith. The candidate path having the highest candidate path preference is the active candidate path. If there is a failure of the active candidate path, then the candidate path having the next-highest candidate path preference becomes the active candidate path.

The communication system 100, as indicated above, is configured to support a P2MP Policy including a set of candidate paths. A candidate path of a P2MP Policy is represented via <Root-ID, Tree-ID>, where <Root-ID> is a unique identifier of the root node of the P2MP Policy and <Tree-ID> is the unique identifier of the P2MP Policy on the root node. A candidate path is built from multiple path-instances which are used for global optimization of the candidate path. A candidate path does not have forwarding information; rather, forwarding of the multicast stream via the candidate path is performed based on a set of replication segments configured on the root node, transit nodes, and leaf nodes of the candidate path. The replication segments for a candidate path have forwarding information and can forward the multicast stream from the root to the set of leaves via the set of transit nodes. The replication segments of a candidate path are identified via <Root-ID, Tree-ID, path-instance-id> and, as a result, on the transit nodes and leaf nodes a set of replication segments of the candidate path can be associated to P2MP Policy via the common identifier <Root-ID, Tree-ID>. The candidate paths may be used to support resilient multicast of traffic from the root node to the leaf nodes.

The communication system 100, as indicated above, is configured to support a P2MP Policy including a set of candidate paths which may be used to support resilient multicast of traffic from the root node to the leaf nodes. The root node sends the same multicast stream on each of the candidate paths and their associated replication segments, and each of the leaf nodes decides which of the replication segments is associated with the highest preference candidate path traffic and processes the multicast stream on that candidate path while not listening to the other multicast streams arriving on the other replication segments of the other candidate paths. The sending of the same multicast stream on each of the candidate paths enables support for switching between candidate paths based on detection of various conditions and, thus, support for fast failover for the P2MP Policy. The leaf nodes can be programmed with candidate path preference information for the candidate paths of the P2MP Policy for use in receiving, processing, and selection of multicast traffic from the candidate paths of the P2MP Policy. The leaf nodes receive the multicast traffic via the candidate paths, determine which replication segment is associated with the candidate path having the highest candidate path preference, and process the multicast traffic received via that replication segment associated with the candidate path having the highest candidate path preference without accepting and processing the multicast traffic received via other replication segments associated with other candidate paths. It will be appreciated that the selection between candidate paths at the leaf nodes may be performed independently at the leaf nodes (e.g., different leaf nodes may select different ones of the candidate paths from which to receive and process the multicast traffic based on the conditions at the leaf nodes, respectively).

The communication system 100 is configured to provide leaf nodes of a P2MP Policy with candidate path preference information for the candidate paths of the P2MP Policy. This enables the replication segments of the candidate paths of the P2MP Policy to know the candidate path preference information for the candidate paths and, thus, the preference of the multicast traffic being forwarded. This enables the leaf nodes of the P2MP Policy to select between the candidate paths based on the candidate path preference information for the candidate paths. In one example embodiment, the candidate path preference information for the candidate paths of the P2MP Policy may be provided to the leaf nodes of the P2MP Policy based on use of a failure detection mechanism (e.g., based on use of the Bidirectional Forwarding Detection (BFD) protocol or other suitable failure detection mechanisms). In one example embodiment, the candidate path preference information for the candidate paths of the P2MP Policy may be provided to the leaf nodes of the P2MP Policy based on inclusion of the candidate path preference information within configuration information provided to the leaf nodes for configuring the leaf nodes to support the candidate paths of the P2MP Policy (e.g., by the network controller 120, via a CLI, or the like, as well as various combinations thereof). It will be appreciated that the candidate path preference information for the candidate paths of the P2MP Policy may be provided to the leaf nodes of the P2MP Policy in various other ways. It will be appreciated that, in at least some such example embodiments, the mechanism that is used for providing the candidate path preference information for the candidate paths of the P2MP Policy to the leaf nodes of the P2MP Policy also may be used to support detection of candidate path failures for supporting switching between candidate paths based on switching between the replication segments for the candidate paths.

In one example embodiment, the candidate path preference information for the candidate paths of the P2MP Policy may be provided to the leaf nodes of the P2MP Policy based on use of a failure detection mechanism. For example, the candidate path preference information may be provided to the leaf nodes of the P2MP Policy based on use of P2MP BFD. For example, the candidate path preference information may be provided to the leaf nodes of the P2MP Policy, based on use of P2MP BFD, by including the candidate path preferences of the candidate paths in the P2MP BFD packets sent on the candidate paths, respectively. The candidate path preference of a candidate path may be communicated within a BFD packet by encoding the candidate path preference within a new Type-Length-Value (TLV). The P2MP BFD packet transmission interval may be set in various ways (e.g., once every three milliseconds, once every ten milliseconds, or the like), which may be configured in various ways (e.g., via a CLI on the root node and the leaf nodes). The leaf nodes each associate the multiple replication segments for the multiple candidate paths of the P2MP Policy with each other via the replication segment identifier <Root-ID, Tree-ID> and, thus, determine precedence between the candidate paths of the P2MP Policy based on the candidate path preferences received in the P2MP BFD packets received on the candidate paths of the P2MP Policy. It will be appreciated that the leaf nodes, based on receipt of the P2MP BFD packets including the candidate path preferences on the candidate paths of the P2MP Policy, can construct and maintain a complete view of the preference for all candidate paths (and, thus, the associated replications segments) which are part of the P2MP Policy. The precedence between the candidate paths of the P2MP Policy, based on the candidate path preferences received in the P2MP BFD packets received on the candidate paths of the P2MP Policy, enables each of the leaf nodes to select between the candidate paths for receiving and processing traffic of the P2MP Policy. The leaf nodes each receive multiple multicast streams via the multiple replication segments that are part of the P2MP Policy (i.e., replication segments having the same <Root-ID, Tree-ID>) and listen to the one of the replication segments that is sending P2MP BFD packets having the TLV with the highest candidate path preference while not listening to the other replication segments that are sending P2MP BFD packets having TLVs with candidate path preferences lower than the highest candidate path preference. In this manner, the leaf node is informed of the candidate path preference information for the candidate paths of the P2MP Policy based on use of the P2MP BFD failure detection mechanism and can use the candidate path preference information for selecting and switching between candidate paths for receiving the multicast traffic of the P2MP Policy. In such embodiments, as discussed further below, various mechanisms (e.g., BFD, traffic monitoring, or the like) may be used to detect candidate path failures for supporting switching between candidate paths based on switching between the replication segments for the candidate paths. An example of an embodiment in which candidate path preference information for the candidate paths of the P2MP Policy is provided to the leaf nodes of the P2MP Policy based on use of a failure detection mechanism is presented with respect to FIG. 3.

In at least some example embodiments, in which candidate path preference information for the candidate paths of the P2MP Policy may be provided to the leaf nodes of the P2MP Policy based on use of a failure detection mechanism, P2MP BFD may be used to detect candidate path failures for supporting switching between candidate paths based on switching between the replication segments for the candidate paths. The P2MP BFD packet transmission interval may be set in various ways (e.g., once every three milliseconds, once every ten milliseconds, or the like), which may be configured in various ways (e.g., via a CLI on the root node and the leaf nodes). This may enable control over the delay between a failure and detection of the failure. The P2MP BFD packets may be used to detect candidate path failures, for supporting switching between candidate paths based on switching between the replication segments for the candidate paths, based on detection of a threshold number of missed P2MP BFD packets (e.g., three consecutive P2MP BFD packets, five consecutive P2MP BFD packets, five of the last seven P2MP BFD packets, or the like). A leaf node, based on detection of a threshold number of missed P2MP BFD packets for a candidate path, may detect a failure of the candidate path and switch to a candidate path having the next highest candidate path preference (e.g., switching to the replication segment with the next highest candidate path preference, in the P2MP BFD TLV, which is still receiving the BFD packets continuously). It will be appreciated that threshold number of missed P2MP BFD packets used for detection of a replication segment failure can be configurable (e.g., via a CLI on the leaf node).

In at least some example embodiments, in which candidate path preference information for the candidate paths of the P2MP Policy may be provided to the leaf nodes of the P2MP Policy based on use of a failure detection mechanism, traffic monitoring may be used to detect candidate path failures for supporting switching between candidate paths based on switching between the replication segments for the candidate paths. A leaf node may monitor for candidate path failure detection by monitoring one or more rates of the replication segments of the candidate paths (e.g., a traffic rate, a traffic loss rate, or the like). A leaf node may monitor for candidate path failure detection by monitoring a rate for the replication segment of a currently active candidate path at the leaf node and, based on a determination that the monitored rate satisfies an associated threshold, detecting a failure of the currently active candidate path at the leaf node. The rate that is monitored may be configured by a controller, by a user via a CLI, or the like. The leaf node, based on detection of a failure of the currently active candidate path, may switch to one of the candidate paths having a next highest candidate path preference and then begin monitoring the for candidate path detection of the newly active candidate path by monitoring a rate for the replication segment of a newly active candidate path at the leaf node. For example, when the active candidate path traffic rate experiences a configured traffic lost delta between active candidate path and the next highest preference candidate path, then the leaf will listen to the replication segment associated with the next highest preference candidate path. For example, if there are multiple replication segments belonging to the same candidate path, the leaf can switch from the active candidate path to the lowest preference candidate path if all other replication segments are experiencing traffic loss lower than the configured traffic lost delta. It will be appreciated that use of traffic monitoring for failure detection for the candidate paths may allow the P2MP BFD packets with the candidate path preference information to be sent in longer intervals (e.g., twice each second, one each second, once every five seconds, or the like) as compared with embodiments in which the P2MP BFD packets also are used for failure detection for the candidate paths), thereby reducing the number of P2MP BFD packets that need to be sent on the candidate paths.

In one example embodiment, the candidate path preference information for the candidate paths of the P2MP Policy may be provided to the leaf nodes of the P2MP Policy based on inclusion of the candidate path preference information within configuration information provided to the leaf nodes for configuring the leaf nodes to support the candidate paths of the P2MP Policy. For example, the candidate path preference information may be configured as part of the replication segments on the leaf nodes for the candidate paths. For example, the candidate path preference information may be configured as part of the replication segments on the leaf nodes for the candidate paths at the time of programming the replication segments on the leaf nodes for the candidate paths. The programming of the replication segments on the leaf nodes for the candidate paths may be performed by the network controller 120, via a CLI, or the like, as well as various combinations thereof. The leaf nodes each associate the multiple replication segments for the multiple candidate paths of the P2MP Policy with each other via the replication segment identifier <Root-ID, Tree-ID> and, thus, determine precedence between the replication segments for the multiple candidate paths of the P2MP Policy based on the candidate path preferences configured as part of the replication segments for the multiple candidate paths of the P2MP Policy. The precedence between the replication segments for the multiple candidate paths of the P2MP Policy, based on the candidate path preferences configured as part of the replication segments for the multiple candidate paths of the P2MP Policy, enables each of the leaf nodes to select between the replication segments and, thus, between the candidate paths, for receiving and processing traffic of the P2MP Policy. The leaf nodes each receive multiple multicast streams via the multiple replication segments that are part of the P2MP Policy (i.e., replication segments having the same <Root-ID, Tree-ID>) and listen to the one of the replication segments that is configured with the highest candidate path preference while not listening to the other replication segments configured with candidate path preferences lower than the highest candidate path preference. In this manner, the leaf node is informed of the candidate path preference information for the candidate paths of the P2MP Policy based on inclusion of the candidate path preference information within configuration information provided to the leaf nodes for configuring the leaf nodes to support the candidate paths of the P2MP Policy and can use the candidate path preference information for selecting and switching between candidate paths for receiving the multicast traffic of the P2MP Policy. In such embodiments, as discussed further below, various mechanisms (e.g., BFD, traffic monitoring, or the like) may be used to detect candidate path failures for supporting switching between candidate paths based on switching between the replication segments for the candidate paths. An example of an embodiment in which candidate path preference information for the candidate paths of the P2MP Policy is provided to the leaf nodes of the P2MP Policy based on inclusion of the candidate path preference information within configuration information provided to the transit nodes and leaf nodes for configuring the leaf nodes to support the candidate paths of the P2MP Policy is presented with respect to FIG. 4.

In at least some example embodiments, in which candidate path preference information for the candidate paths of the P2MP Policy is provided to the leaf nodes of the P2MP Policy based on inclusion of the candidate path preference information within configuration information provided to the leaf nodes for configuring the leaf nodes to support the candidate paths of the P2MP Policy, BFD may be used to detect candidate path failures for supporting switching between candidate paths based on switching between the replication segments for the candidate paths. The root node sends the multicast stream on each of the candidate paths and also sends BFD packets on each of the candidate paths. It will be appreciated that, since the replication segments of the leaf nodes are made aware of the candidate path preferences of the candidate paths based on the configuration information used to configure the replication segments of the candidate paths, the BFD packets do not need to include the candidate path preference TLVs including the candidate path preferences of the candidate paths (although it will be appreciated that the candidate path preference TLVs including the candidate path preferences of the candidate paths still may be included within the BFD packets). The BFD packet intervals for sending of the BFD packets on the candidate paths by the root node of the P2MP Policy may be configurable (e.g., 10 milliseconds, 3 milliseconds, 1 millisecond, or the like). The BFD packet loss threshold for declaring a candidate path down on a leaf node may be configurable (e.g., 3 packets, 1 packet, or the like). The leaf node receives and processes multicast traffic via a replication segment associated with a candidate path having the highest candidate path preference (excluding any candidate paths which may be experiencing failures). The leaf node monitors for loss of BFD packets on the active candidate path based on the BFD packet loss threshold and, upon not receiving a number of BFD packets that satisfies the BFD packet loss threshold, switches from the replication segment associated with the candidate path having the highest candidate path preference to a replication segment associated with the candidate path having the next-highest candidate path preference (again, excluding any candidate paths which may be experiencing failures), such that the leaf node then receives and processes multicast traffic via the candidate path having the next-highest candidate path preference (i.e., the active candidate path is switched at the leaf node based on BFD monitoring).

In at least some example embodiments, in which candidate path preference information for the candidate paths of the P2MP Policy is provided to the leaf nodes of the P2MP Policy based on inclusion of the candidate path preference information within configuration information provided to the leaf nodes for configuring the leaf nodes to support the candidate paths of the P2MP Policy, traffic monitoring may be used to detect candidate path failures for supporting switching between candidate paths based on switching between the replication segments for the candidate paths. The root node sends the multicast stream on each of the candidate paths. The leaf node listens to each of the replication segments of the candidate paths of the P2MP Policy. A traffic monitoring rate (e.g., a traffic rate, a traffic loss rate, or the like) is configured on the leaf node for use by the leaf node to monitor the candidate paths for supporting switching between the candidate paths based on the candidate path preferences of the candidate paths. The leaf node receives and processes multicast traffic via a replication segment associated with a candidate path having the highest candidate path preference (excluding any candidate paths which may be experiencing failures), such that the replication segment is considered to be the active replication segment and the associated candidate path is considered to be the active candidate path. The traffic monitoring rate may be used as a delta between the active replication segment associated with the active candidate path of the P2MP Policy and the other replication segments associated with the other candidate paths of the P2MP Policy. The leaf node monitors the traffic on the active candidate path associated with the active replication segment and, based on detection of traffic loss on the active candidate path, switches from the active replication segment associated with the active candidate path having the highest candidate path preference to a replication segment associated with the candidate path having the next-highest candidate path preference and having a traffic rate that satisfies (e.g., greater than) the traffic monitoring rate, such that the leaf node then receives and processes multicast traffic via the candidate path having the next-highest candidate path preference and having a traffic rate that satisfies (e.g., greater than) the traffic monitoring rate (i.e., the active candidate path is switched at the leaf node based on BFD monitoring).

Figure 2:
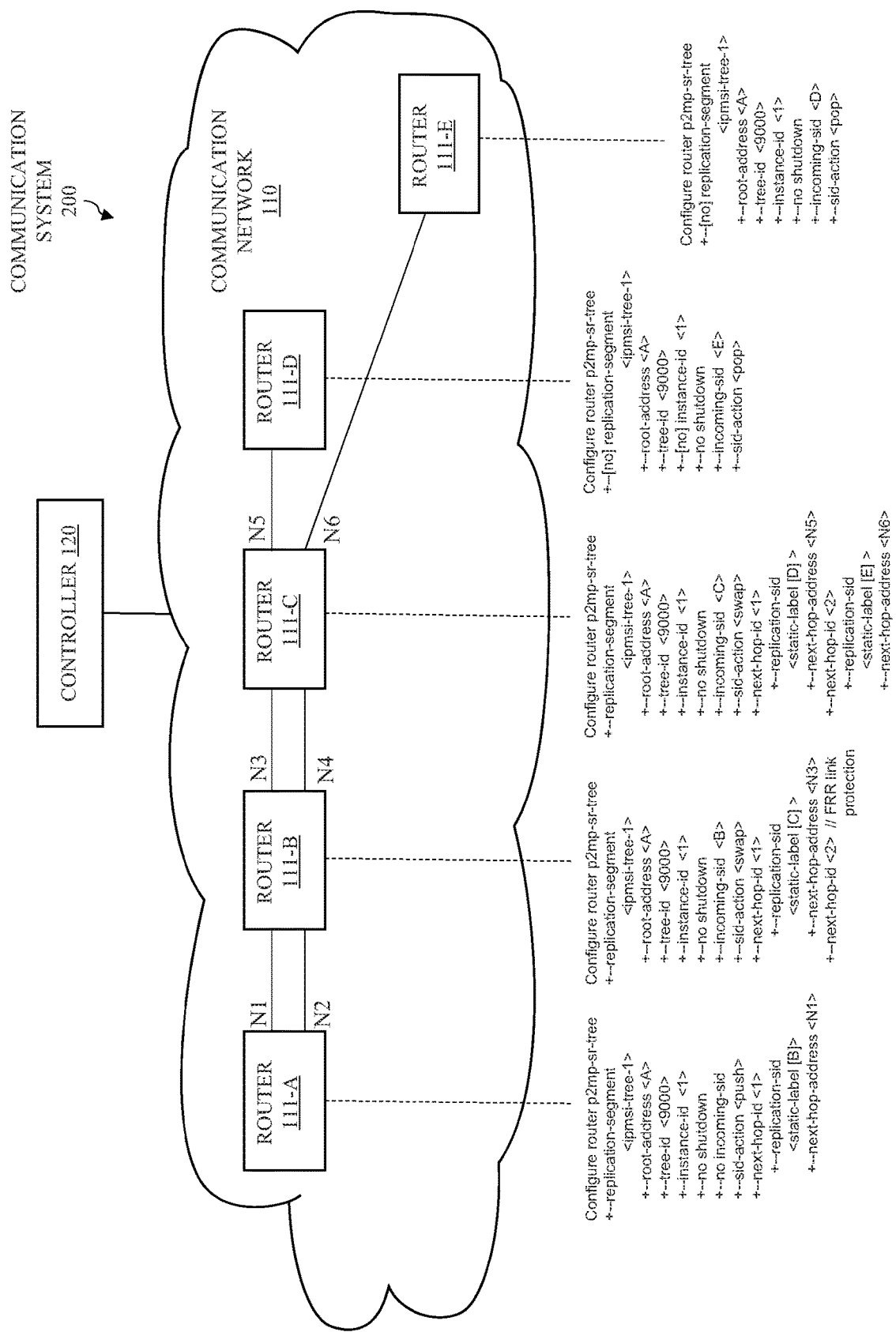
FIG. 2 depicts the communication system of FIG. 1 for illustrating forwarding information of replication segments configured to support candidate path selection.

FIG. 2 depicts the communication system of FIG. 1 for illustrating forwarding information of replication segments configured to support candidate path selection. As depicted in the communication system 200 of FIG. 2, each of the nodes 110 has a replication segment configured thereon. The replication segments each are using the same replication segment identifier <Root-ID, Tree-ID> (illustratively, <root-address>=A and <tree-id>=9000). The replication segments each have associated forwarding information for supporting forwarding of multicast packets, such as identification of the incoming SID from which multicast packets are received, an indication of the SID action to be performed (e.g., PUSH, SWAP, POP) on received multicast packets, an indication of the next hop(s) supported, and so forth. It will be appreciated that replication segments may be configured in other ways, may include less or more information, or the like, as well as various combinations thereof.

Figure 3:
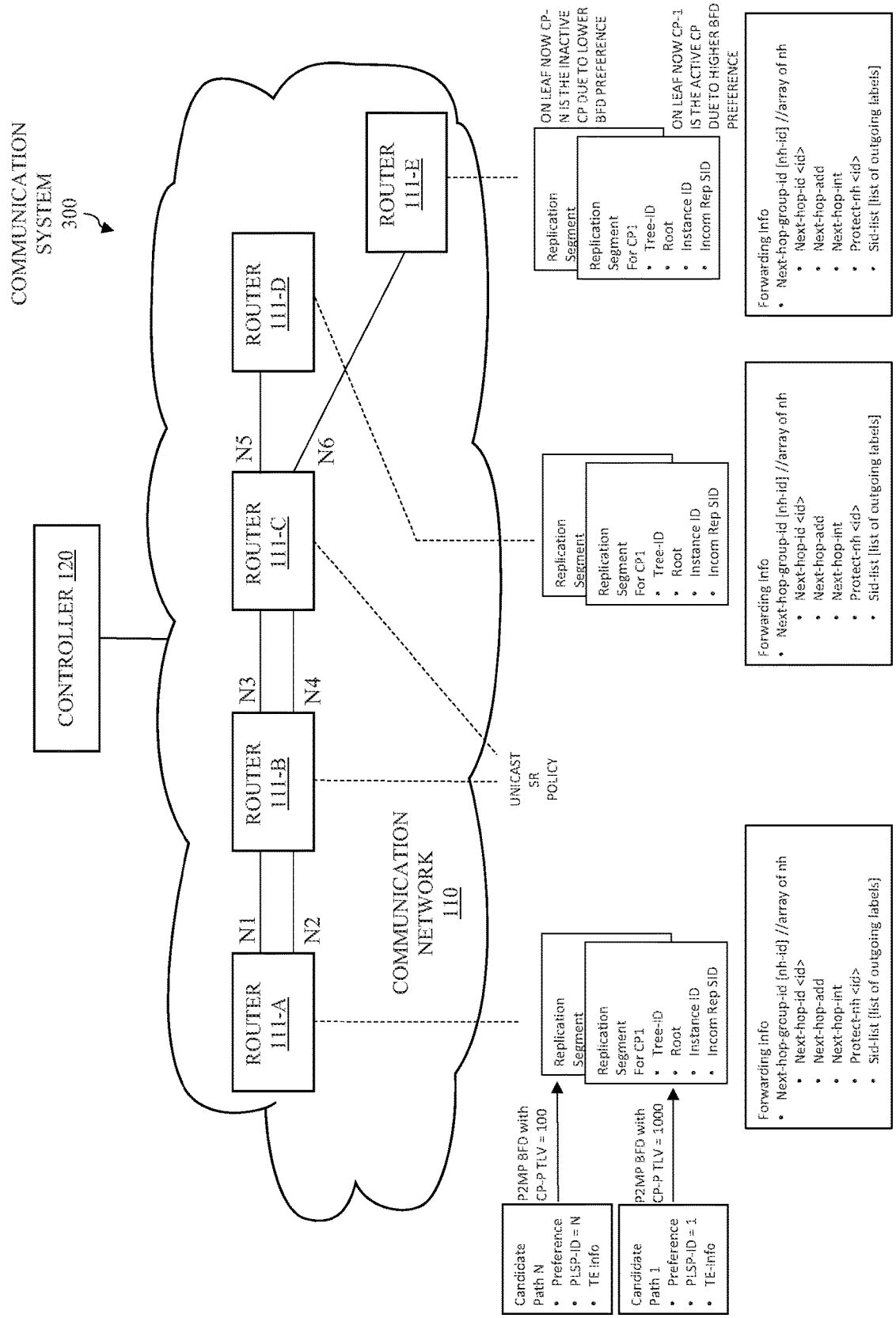
FIG. 3 depicts the communication system of FIG. 1 for illustrating distribution of candidate path preference information based on failure monitoring.

FIG. 3 depicts the communication system of FIG. 1 for illustrating distribution of candidate path preference information based on failure monitoring. As depicted in the communication system 300 of FIG. 3, there are N candidate paths which form part of the P2MP Policy between root router 111-A and the leaf routers 111-D and 111-E. The N candidate paths have candidate path preference values (denoted in FIG. 3 as CP-P values) associated therewith (illustratively, CP-P=1000 for candidate path 1 and CP-P=100 for candidate path N). The routers 111-A, 111-D, and 111-E (although omitted for router 111-C and router 111-D, for purposes of clarity) each include replication segments for each of the N candidate paths. The root node 111-A sends P2MP BFD packets on each of the N candidate paths. The P2MP BFD packets include TLVs which encode the candidate path preference values for the candidate paths, respectively. The P2MP BFD packets including the candidate path preference values are received by leaf routers 111 of the candidate paths (illustratively, routers 111-D and 111-E) such that the leaf routers 111 of the candidate paths have the candidate path preference values for the candidate paths, respectively, and, thus, can select between the candidate paths for receiving multicast traffic based on the candidate path preference values for the candidate paths (e.g., for an initial selection of one of the candidate paths, for a switch between candidate paths based on detection of a failure of one of the candidate paths, or the like). For example, as depicted in the example of FIG. 3, leaf routers 111-D and 111-E each receive P2MP BFD packets including the candidate path preference values for the candidate paths (illustratively, a P2MP BFD packet including a CP-P value of 100 is sent by the root router 111-A over candidate path 1 such that the BFD packet with CP-P=100 is received by leaf routers 111-D and 111-E for candidate path 1 and, similarly, a P2MP BFD packet including a CP-P value of 1000 is sent by the root router 111-A over candidate path N such that the BFD packet with CP-P=1000 is received by leaf routers 111-D and 111-E for candidate path N). For example, as depicted in the example of FIG. 3, leaf routers 111-D and 111-E initially accept multicast traffic received via candidate path 1 and ignore the multicast traffic received via the other candidate paths, but may switch to accepting multicast traffic received via a different candidate path (e.g., based on detection of a decrease in the candidate path preference value of candidate path 1 such that it candidate path 1 no longer has the highest candidate path value, based on detection of a failure of candidate path 1, or the like).

Figure 4:
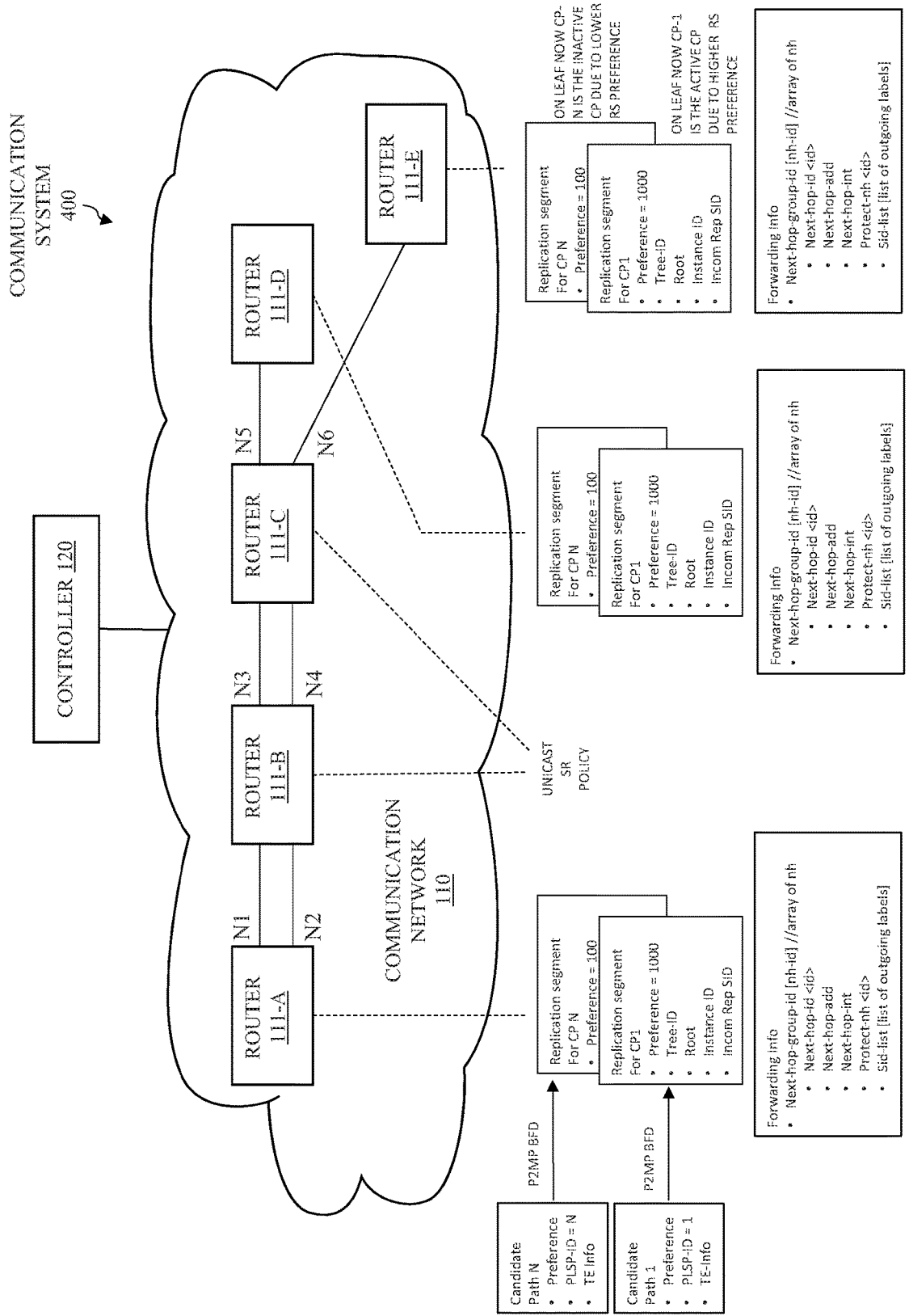
FIG. 4 depicts the communication system of FIG. 1 for illustrating distribution of candidate path preference information based on network configuration.

FIG. 4 depicts the communication system of FIG. 1 for illustrating distribution of candidate path preference information based on network configuration. As depicted in the communication system 400 of FIG. 4, there are N candidate paths which form part of the P2MP Policy between root router 111-A and the leaf routers 111-D and 111-E. As depicted in FIG. 4, there are N candidate paths which form part of the P2MP Policy between root router 111-A and the leaf routers 111-D and 111-E. The N candidate paths have candidate path preference values (denoted in FIG. 4 as CP-P values) associated therewith (illustratively, CP-P=1000 for candidate path 1 and CP-P=100 for candidate path N). The routers 111-A, 111-D, and 111-E (although omitted for router 111-C and router 111-D, for purposes of clarity) each include replication segments for each of the N candidate paths. The replication segments on the leaf routers 111 of the candidate paths (illustratively, routers 111-D and 111-E) are configured with the candidate path preference values for the candidate paths, respectively, such that the leaf routers 111 of the candidate paths have the candidate path preference values for the candidate paths, respectively, and, thus, can select between the candidate paths for receiving multicast traffic based on the candidate path preference values for the candidate paths (e.g., for an initial selection of one of the candidate paths, for a switch between candidate paths based on detection of a failure of one of the candidate paths, or the like). For example, as depicted in the example of FIG. 4, leaf routers 111-D and 111-E each receive replication segment configuration information including the candidate path preference values for the candidate paths (illustratively, on root router 111-A the replication segment for candidate path 1 is configured to include a CP-P value of 100 and the replication segment for candidate path N is configured to include a CP-P value of 1000, on leaf router 111-D the replication segment for candidate path 1 is configured to include a CP-P value of 100 and the replication segment for candidate path N is configured to include a CP-P value of 1000, and on leaf router 111-E the replication segment for candidate path 1 is configured to include a CP-P value of 100 and the replication segment for candidate path N is configured to include a CP-P value of 1000). For example, as depicted in the example of FIG. 4, leaf routers 111-D and 111-E initially accept multicast traffic received via candidate path 1 and ignore the multicast traffic received via the other candidate paths, but may switch to accepting multicast traffic received via a different candidate path (e.g., based on detection of a decrease in the candidate path preference value of candidate path 1 such that it candidate path 1 no longer has the highest candidate path value, based on detection of a failure of candidate path 1, or the like).

It will be appreciated that although primarily presented with respect to supporting failover switching between a set of candidate paths within the context of P2MP Policy, various example embodiments presented herein may be used for supporting failover switching between a set of candidate paths in various other contexts (e.g., within the context of a Segment Routing (SR) policy or within other contexts in which multiple candidate paths may be used).

Figure 5:
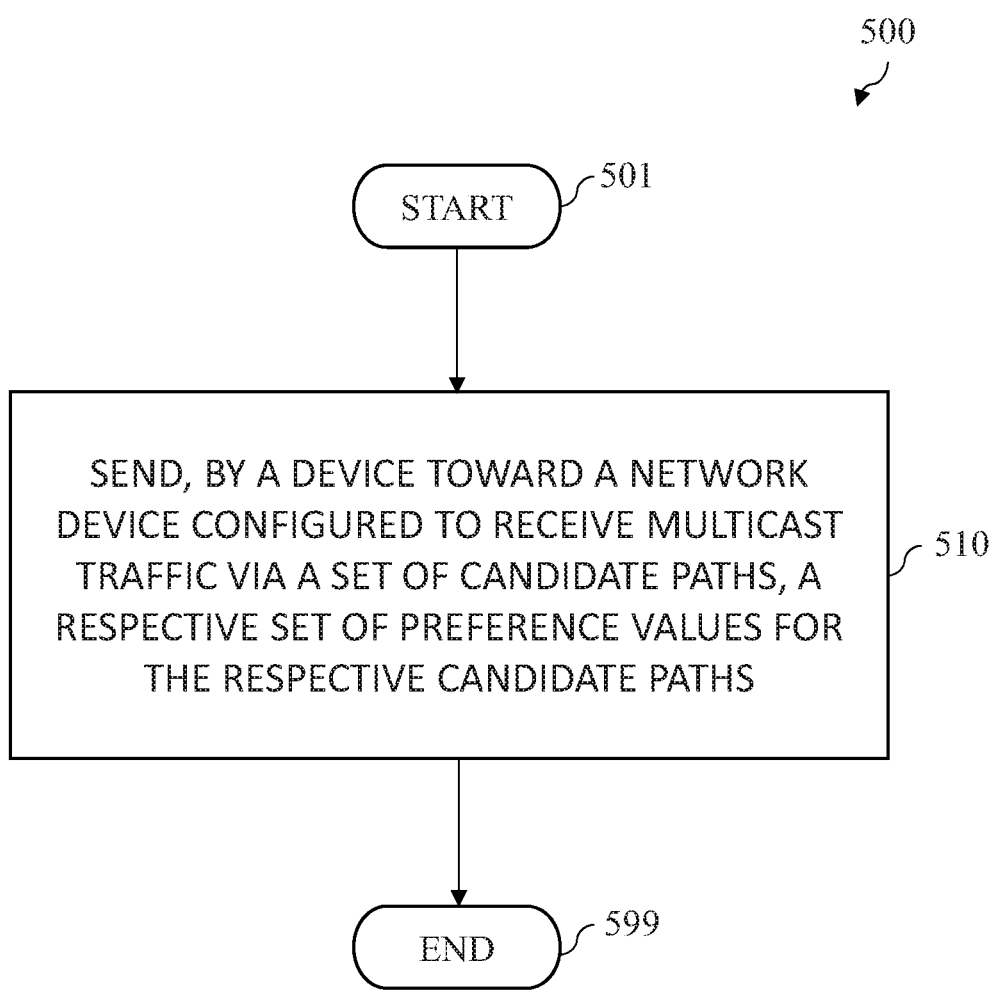
FIG. 5 depicts an example embodiment of a method for use by a network device to support candidate path selection based on candidate path preference information.

FIG. 5 depicts an example embodiment of a method for use by a network device to support candidate path selection based on candidate path preference information. It will be appreciated that, in at least some embodiments (e.g., where the candidate paths are P2MP trees), the network device may be a network controller, a root node of the candidate paths, or the like. It will be appreciated that, although primarily presented as being performed serially, at least a portion of the functions of method 500 may be performed contemporaneously or in a different order than as presented with respect to FIG. 5. At block 501, method 500 begins. At block 510, send, by a device toward a network device configured to receive multicast traffic via a set of candidate paths, a respective set of preference values for the respective candidate paths. At block 599, the method 500 ends. In at least some example embodiments, for at least one of the candidate paths, the respective preference value is sent in a failure detection message configured to support failure detection for the respective candidate path. In at least some example embodiments, for at least one of the candidate paths, the respective preference value is sent as a part of configuration information for a multicast forwarding element of the network device. In at least some example embodiments, the multipath forwarding element includes a replication segment. In at least some example embodiments, the set of candidate paths is associated with a multicast tree having a root node and a set of leaf nodes. In at least some example embodiments, the set of candidate paths is associated with a P2MP policy. It will be appreciated that various packet routing support functions presented herein with respect to FIGS. 1-4 may be incorporated within the context of method 500 of FIG. 5.

Figure 6:
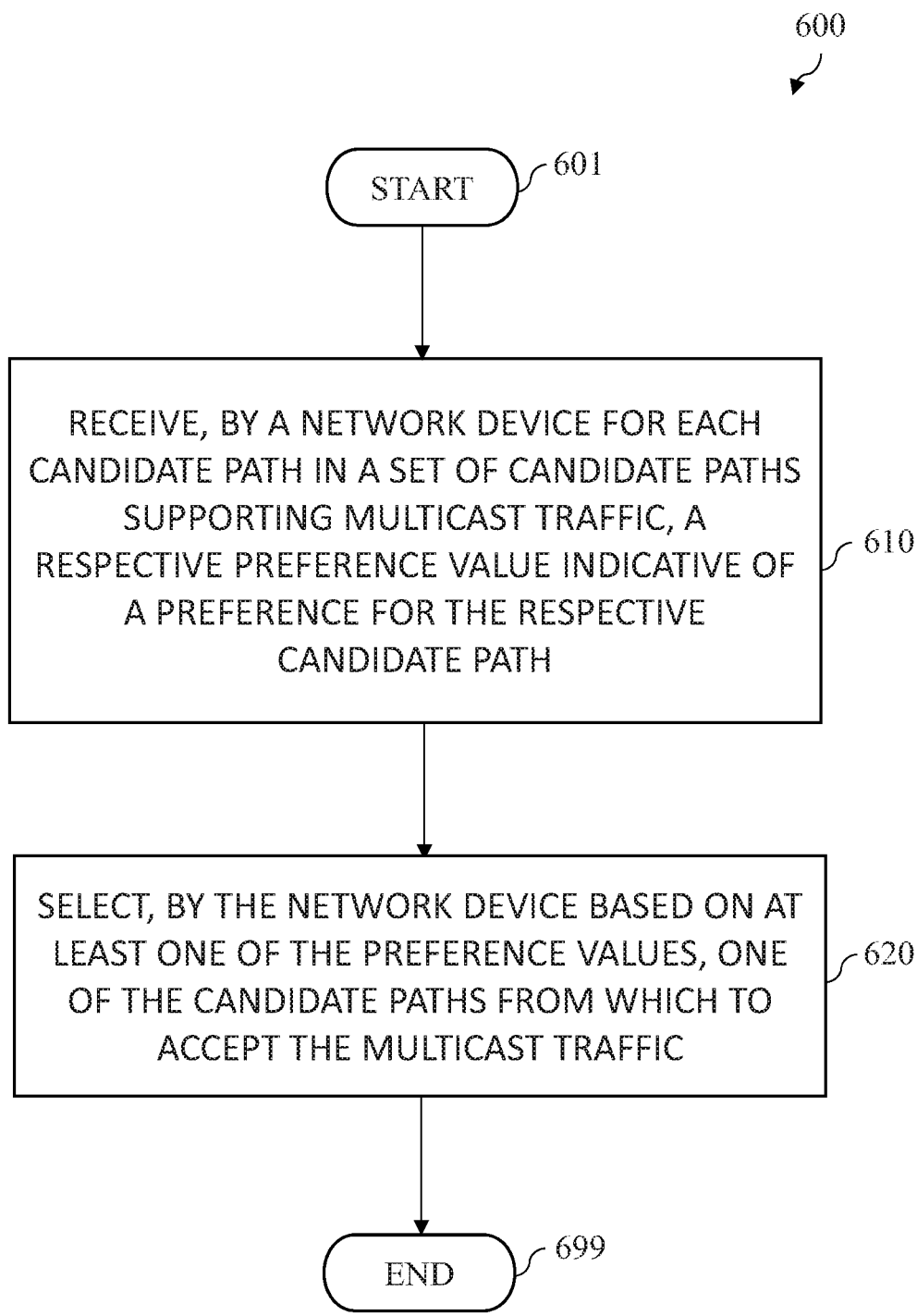
FIG. 6 depicts an example embodiment of a method for use by a network device to support candidate path selection based on candidate path preference information.

FIG. 6 depicts an example embodiment of a method for use by a network device to support candidate path selection based on candidate path preference information. It will be appreciated that, in at least some embodiments (e.g., where the candidate paths are P2MP trees), the network device may be a leaf node of the candidate paths or the like. It will be appreciated that, although primarily presented as being performed serially, at least a portion of the functions of method 600 may be performed contemporaneously or in a different order than as presented with respect to FIG. 6. At block 601, the method 600 begins. At block 610, receive, by a network device for each candidate path in a set of candidate paths supporting multicast traffic, a respective preference value indicative of a preference for the respective candidate path. At block 620, select, by the network device based on at least one of the preference values, one of the candidate paths from which to accept the multicast traffic. At block 699, the method 600 ends.

In at least some example embodiments, for at least one of the candidate paths, the respective preference value is received in a failure detection message configured to support failure detection for the respective candidate path. In at least some example embodiments, the failure detection message includes a point-to-multipoint bidirectional failure detection message. In at least some example embodiments, the failure detection message includes a BFD packet. In at least some example embodiments, the failure detection message includes a Point-to-Multipoint (P2MP) Bidirectional Forwarding Detection (BFD) packet. In at least some example embodiments, the candidate path preference is received in a Type-Length-Value (TLV) of the P2MP BFD packet. In at least some example embodiments, the network device detects, based on one or more failure detection messages, a failure of the one of the candidate paths and selects a new one of the candidate paths from which to accept the multicast traffic. In at least some example embodiments, the failure of the one of the candidate paths is detected based on monitoring of respective traffic rates for the respective candidate paths.

In at least some example embodiments, for at least one of the candidate paths, the respective preference value is received as a part of configuration information for a multicast forwarding element of the network device. In at least some example embodiments, the multipath forwarding element includes a replication segment. In at least some example embodiments, the configuration information is received from a network controller. In at least some example embodiments, the configuration information is received via a CLI. In at least some example embodiments, the network device detects, based on one or more failure detection messages, a failure of the one of the candidate paths and selects a new one of the candidate paths from which to accept the multicast traffic. In at least some example embodiments, the failure of the one of the candidate paths is detected based on at least one of monitoring for respective failure detection messages for the respective candidate paths or monitoring of respective traffic rates for the respective candidate paths.

It will be appreciated that various packet routing support functions presented herein with respect to FIGS. 1-4 may be incorporated within the context of method 600 of FIG. 6.

Various example embodiments for supporting candidate path selection in a communication system may provide various advantages or potential advantages. For example, various example embodiments for supporting candidate path selection in a communication system may be configured to support fast switchover between candidate paths where fast switchover, in at least some contexts, may be considered to be a switchover performed within tens of milliseconds. For example, various example embodiments for supporting candidate path selection in a communication system may be configured to support candidate path selection without relying on explicit candidate path selection provided by a controller (e.g., when a router on the P2MP path goes down the network link state is sent to the controller via Border Gateway Protocol-Link State (BGP LS) or some other equivalent mechanism and the controller switches between the candidate paths by setting the candidate path status to down on the root node, which is a time-consuming process) or provided by an explicit configuration via a CLI (e.g., via user programming of the candidate path preference or shutting down the unrepairable candidate path via CLI, which also is a time-consuming process), although it will be appreciated that such mechanisms still may be used. Various example embodiments for supporting candidate path selection in a communication system may provide various other advantages or potential advantages.

Figure 7:
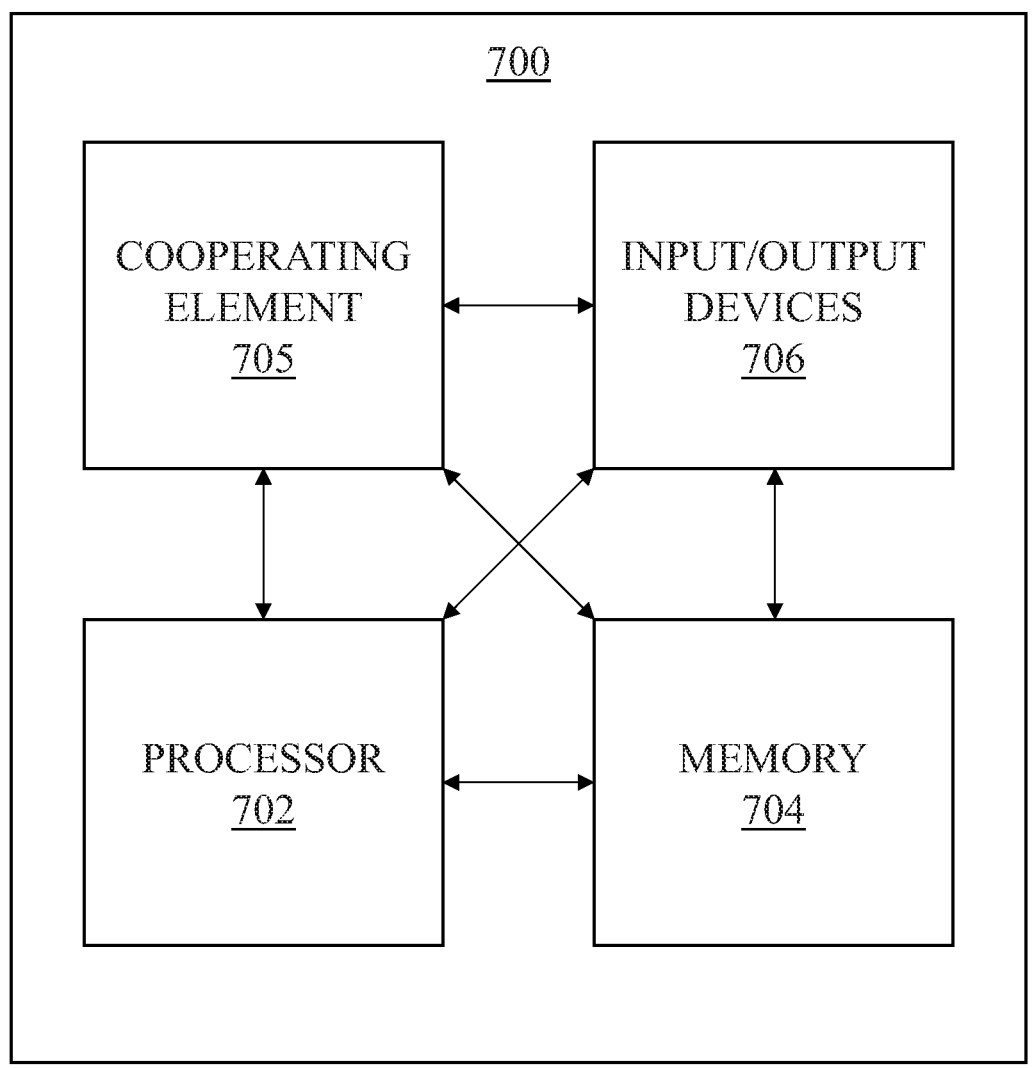
FIG. 7 depicts an example embodiment of a computer suitable for use in performing various functions presented herein.

FIG. 7 depicts an example embodiment of a computer suitable for use in performing various functions presented herein.

The computer 700 includes a processor 702 (e.g., a central processing unit (CPU), a processor, a processor having a set of processor cores, a processor core of a processor, or the like) and a memory 704 (e.g., a random access memory, a read only memory, or the like). The processor 702 and the memory 704 may be communicatively connected. In at least some example embodiments, the computer 700 may include at least one processor and at least one memory including computer program code, wherein the at least one memory and the computer program code are configured to, with the at least one processor, cause the computer to perform various functions presented herein.

The computer 700 also may include a cooperating element 705. The cooperating element 705 may be a hardware device. The cooperating element 705 may be a process that can be loaded into the memory 704 and executed by the processor 702 to implement various functions presented herein (in which case, for example, the cooperating element 705 (including associated data structures) can be stored on a non-transitory computer-readable storage medium, such as a storage device or other suitable type of storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 may represent a general architecture and functionality suitable for implementing functional elements described herein, portions of functional elements described herein, or the like, as well as various combinations thereof. For example, computer 700 may provide a general architecture and functionality that is suitable for implementing one or more elements presented herein, such as a router 111 or a portion thereof, a candidate path selection element 112 or a portion thereof, the network controller 120 or a portion thereof, the candidate path selection element 121 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    at least one processor; and
    at least one memory storing instructions that, when executed by the at least one processor, cause the apparatus to:
        maintain, by a network device for a point-to-multipoint policy, a set of replication segments configured to support communication via a respective set of candidate paths of the point-to-multipoint policy;
        receive, by the network device, a set of preference values for the candidate paths that includes, for each of the candidate paths, a respective preference value indicative of a preference for the respective candidate path;

associate, by the network device with the respective replication segments, the respective preference values for the candidate paths;

receive, by the network device via each of the candidate paths in the set of candidate paths, multicast traffic; and select, by the network device based on at least one of the preference values, one of the candidate paths from which to accept the multicast traffic.

2. The apparatus of claim 1, wherein, for at least one of the candidate paths, the respective preference value for the candidate path is received in a failure detection message configured to support failure detection for the candidate path.

3. The apparatus of claim 2, wherein the failure detection message includes a point-to-multipoint bidirectional failure detection message.

4. The apparatus of claim 2, wherein the failure detection message includes a Bidirectional Forwarding Detection (BFD) packet.

5. The apparatus of claim 2, wherein the failure detection message includes a Point-to-Multipoint (P2MP) Bidirectional Forwarding Detection (BFD) packet.

6. The apparatus of claim 5, wherein the respective preference value is received in a Type-Length-Value (TLV) of the P2MP BFD packet.

7. The apparatus of claim 2, wherein the instructions, when executed by the at least one processor, cause the apparatus to:

detect, by the network device based on one or more failure detection messages, a failure of the one of the candidate paths; and select, by the network device, a new one of the candidate paths from which to accept the multicast traffic.

8. The apparatus of claim 7, wherein the failure of the one of the candidate paths is detected based on monitoring of respective traffic rates for the candidate paths.

9. The apparatus of claim 1, wherein, for at least one of the candidate paths, the respective preference value for the candidate path is received as a part of configuration information for the segment.

10. The apparatus of claim 9, wherein the configuration information is received from a network controller.

11. The apparatus of claim 9, wherein the configuration information is received via a command line interface (CLI).

12. The apparatus of claim 9, wherein the instructions, when executed by the at least one processor, cause the apparatus to:

detect, by the network device based on one or more failure detection messages, a failure of the one of the candidate paths; and select, by the network device from the set of candidate paths, a new one of the candidate paths from which to accept the multicast traffic.

13. The apparatus of claim 12, wherein the failure of the one of the candidate paths is detected based on at least one of monitoring for respective failure detection messages for the candidate paths or monitoring of respective traffic rates for the candidate paths.

14. The apparatus of claim 1, wherein the one of the candidate paths from which to accept the multicast traffic is one of the candidate paths having a highest preference value.

15. The apparatus of claim 1, wherein the point-to-multipoint policy is associated with a multicast tree having a root node and a set of leaf nodes.

16. The apparatus of claim 15, wherein the network device includes one of the leaf nodes.

17. A method, comprising:

maintaining, by a network device for a point-to-multipoint policy, a set of replication segments configured to support communication via a respective set of candidate paths of the point-to-multipoint policy;

receiving, by the network device, a set of preference values for the candidate paths that includes, for each of the candidate paths, a respective preference value indicative of a preference for the respective candidate path;

associating, by the network device with the respective replication segments, the respective preference values for the candidate paths;

receiving, by the network device via each of the candidate paths in the set of candidate paths, multicast traffic; and selecting, by the network device based on at least one of the preference values, one of the candidate paths from which to accept the multicast traffic.

* * * * *

UNITED STATES PATENT AND TRADEMARK OFFICE
CERTIFICATE OF CORRECTION

| | | |
|---|---|---|
| PATENT NO. | : 11,695,685 B2 | Page 1 of 1 |
| APPLICATION NO. | : 16/902970 | |
| DATED | : July 4, 2023 | |
| INVENTOR(S) | : Hooman Bidgoli | |

It is certified that error appears in the above-identified patent and that said Letters Patent is hereby corrected as shown below:

In the Claims

Claim 9; Column 19, Line 41, after "information for the" insert --replication--.

Signed and Sealed this
Twenty-third Day of July, 2024

Katherine Kelly Vidal
*Director of the United States Patent and Trademark Office*